United States Patent Office 3,397,356
Patented Aug. 13, 1968

3,397,356
METHODS OF INVESTIGATING SUBSURFACE EARTH FORMATIONS BY COMBINING THE ELECTRICAL RESISTIVITIES AT DIFFERENT LATERAL DEPTHS WITHIN THE FORMATIONS
Jean L. Dumanoir, New York, N.Y., assignor to Schlumberger Technology Corporation, Houston, Tex., a corporation of Texas
Filed May 27, 1966, Ser. No. 553,450
4 Claims. (Cl. 324—1)

ABSTRACT OF THE DISCLOSURE

One embodiment of the invention indicates the presence and relative movability of hydrocarbons within an earth formation. The spontaneous potential ("SP") is contrasted with a value X that is determined through the equation:

$$X = -K \log \left(\frac{R_{xo}}{R_t}\right)_{QL}$$

Figure 1:
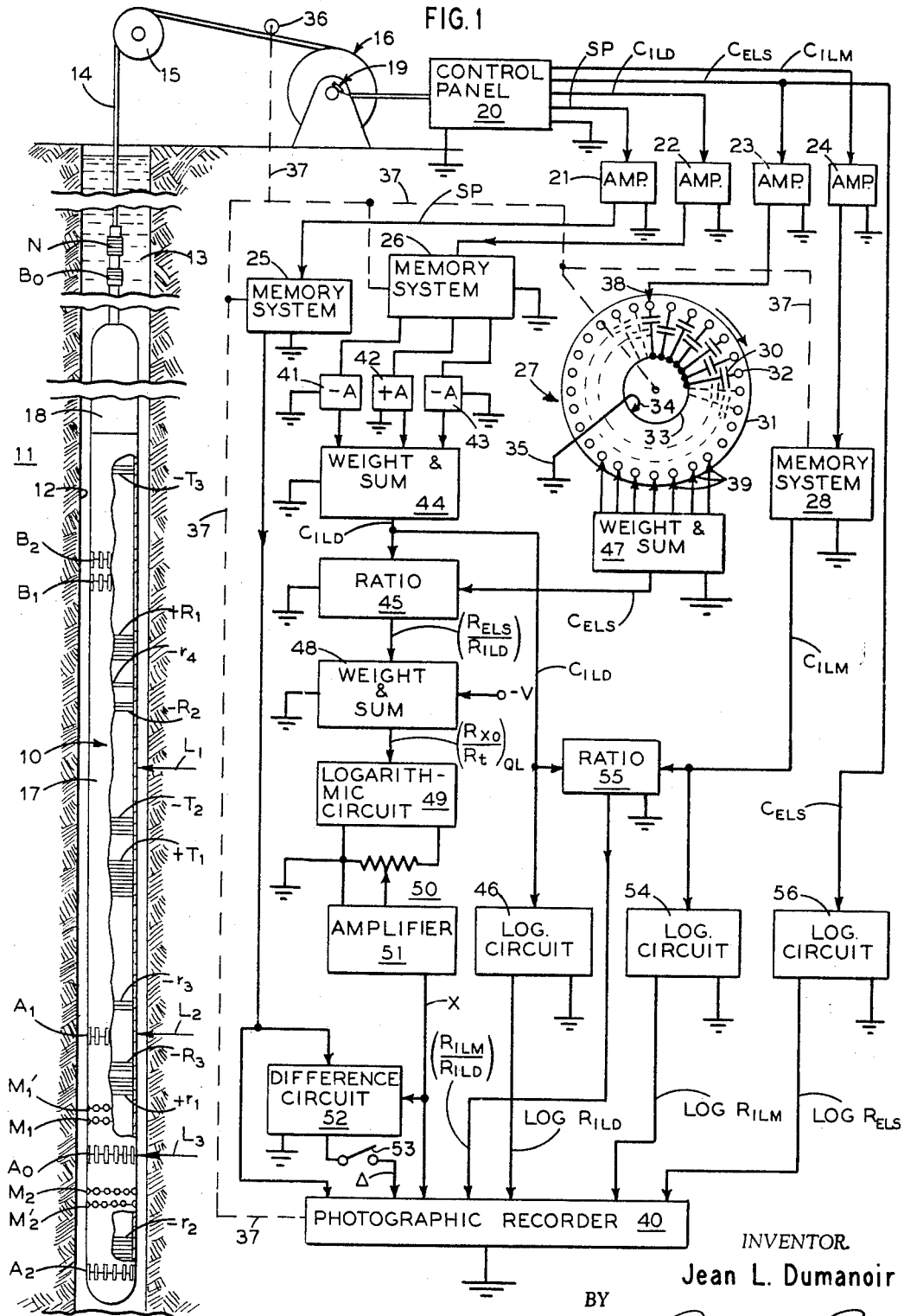

Differences, Δ, between X and SP identify a production horizon and provide an indication of potential hydrocarbon production. The reliability of these data is verified by the ratio:

$$R_{ILM}/R_{ILD}$$

which, if more than about 1.15, indicates that filtrate invasion is deep and that the foregoing analysis is trustworthy.

---

This invention relates to methods and apparatus for investigating subsurface earth formations and, particularly, to electrical methods and apparatus which enable the character of the subsurface fluids to be more quickly and readily evaluated.

In electrical well logging, various exploring devices and instruments are moved through an oil-well type borehole drilled deep into the earth for measuring the naturally-occurring spontaneous potential in the borehole and the electrical resistivities of various portions of the earth formations adjacent to the hole. These measurements are then used to evaluate the subsurface formations and to deduce the character and amount of fluid (e.g., water, oil, gas, etc.) that may be contained in each of the subsurface formations.

Sometimes the interpretation of the electrical records or logs is relatively straightforward. Sometimes it is not. Sometimes the recorded log contains multiple curves covering several hundreds, even thousands, of feet of borehole. Sometimes the curves meander back and forth across the log in a manner which makes it difficult to quickly determine which of the subsurface earth strata contain significant quantities of producible hydrocarbons.

It is an object of the invention, therefore, to provide new and improved methods of electrical borehole logging which enable a quicker and easier evaluation of subsurface earth formations.

It is another object of the invention to provide new and improved methods for quickly and readily distinguishing hydrocarbon-bearing earth strata from water-bearing earth strata by means of electrical logging measurements alone.

It is a further object of the invention to provide new and improved electrical logging methods which are particularly useful in boreholes drilled with fresh drilling muds for rapidly identifying subsurface earth formations containing significant amounts of movable oil and for providing indications of the relative proportions of the movable and residual oil.

It is an additional object of the invention to provide new and improved electrical logging methods which give a useful and readily usable indication of the approximate depth of invasion of drilling mud filtrate fluid into permeable formations.

The advantages of the invention are realized by providing a computed curve or computed log obtained from earth resistivity measurements which may be directly compared with or combined with the spontaneous potential log to provide a quick and readily visible indication of whether the formation fluid is predominantly water or predominantly hydrocarbon fluid. Not only this, but under typical conditions, the comparison provides at least a qualitative indication of the relative degree of movability of the hydrocarbon fluid in the case of hydrocarbon-bearing formations. A further advantage is realized by providing from the electrical logging measurements a further curve which serves as an index of the lateral depth of invasion of mud filtrate into permeable formations. With the aid of these new logs, long lengths of recorded logs may be quickly scanned and the most promising formations quickly located.

The desired log for comparison with the spontaneous potential log is obtained by combining resistivity measurements (or conductivity measurements) of first and second lateral portions of each of the formations. In each case, the first portion is a formation portion relatively near the borehole and the second portion is a formation portion located at a greater distance from the borehole. The depth of invasion index is also obtained by combining resistivity measurements of first and second formations portions except that, in this case, the first formation portion is located at a distance intermediate those used in obtaining the first computed log.

For a better understanding of the present invention, together with other and further objects thereof, reference is had to the following description taken in connection with the accompanying drawings, the scope of invention being pointed out in the appended claims.

Figure 2:
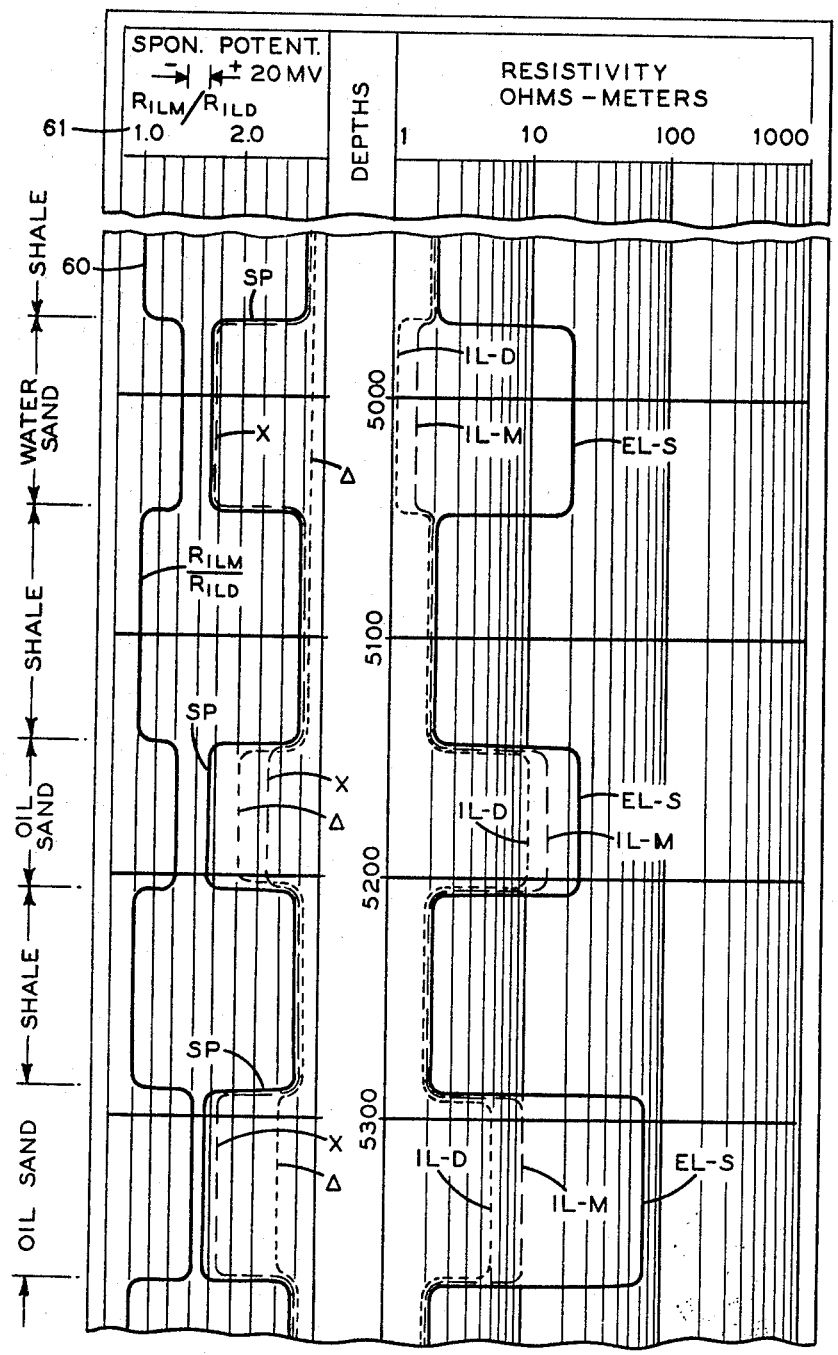

Referring to the drawings:

FIG. 1 shows a representative embodiment of apparatus for practicing the present invention; and FIG. 2 shows a portion of a graphic record or log obtained with the FIG. 1 apparatus.

Referring to FIGURE 1 of the drawings, there is shown borehole logging apparatus 10 for investigating subsurface earth formations 11 traversed by a borehole 12. The borehole 12 is filled with a conductive drilling fluid or drilling mud 13. The downhole apparatus or logging sonde 10 is suspended from the surface of the earth by means of an armored multiconductor cable 14. This cable 14 passes over a pulley 15 and to a drum and winch mechanism 16. Operation of the later serves to move the logging sonde 10 through the borehole 12.

The logging sonde 10 includes an elongated cylindrical support member 17 to which are secured various coils and electrodes for performing the borehole measurements. Secured to the upper end of the support member 17 is a cylindrical fluid-tight housing 18 which contains various electrical circuits for operating the coil and electrode systems. The resulting measurements signals are sent up the conductors in the cable 14 and removed therefrom by means of a suitable brush and slip-ring mechanism 19, whereupon they are supplied to a surface-located control panel 20.

The logging sonde 10 is described in greater detail in copending U.S. patent application Ser. No. 240,568, filed on Nov. 28, 1962 in the name of G. Attali.

Briefly, the support member portion 17 of logging sonde 10 includes a deep investigation induction logging system represented by transmitter coils $T_1$, $T_2$ and $T_3$ and receiver coils $R_1$, $R_2$ and $R_3$. Each coil is of the solenoid type. By "depth investigation" is meant the lateral or horizontal depth to which the system penetrates into the adjacent earth formation. The deep induction system, designated "IL–D," penetrates quite deeply and provides an output signal representative primarily of the electrical conductivity of the formation region at a relatively great lateral distance from the borehole. As such, it will, under favorable conditions, provide a measurement of $R_t$, the resistivity of the virgin or uncontaminated portion of the earth formation.

The support member 17 also includes a medium investigation induction logging system formed by transmitter coils $T_1$, $T_2$ and $T_3$ and receiver coils $r_1$, $r_2$, $r_3$ and $r_4$. This medium depth induction system, designated "IL–M," measures the electrical conductivity of a formation region at an intermediate depth from the borehole.

The support member 17 further includes a shallow investigation electrode system represented by electrodes $A_1$, $M'_1$, $M_1$, $A_0$, $M_2$, $M'_2$ and $A_2$. Additional electrodes $B_0$, $B_1$ $B_2$ and N provide current return and potential reference electrodes for this electrode system. This shallow investigation electrode system, designated "EL–S," measures the electrical conductivity of the formation material fairly close to the wall of the borehole. As such, it will, under favorable conditions, provide indications of the resistivity $R_{xo}$, this being the resistivity of the portion of permeable earth formations which is flushed or invaded by the drilling mud filtrate fluid.

The $A_0$ electrode is also used to measure the spontaneous potential in the borehole. This spontaneous potential, designated "SP," results from the chemical reaction between the drilling mud fluid and the connate formation water. This battery-type reaction produces direct-current electromotive forces.

The various measurement signals derived from the downhole devices are transmitted up the cable 14 and are supplied by way of the control panel 20 to low output impedance amplifiers 21–24. The SP signal is supplied to the amplifier 21, the deep induction signal to the amplifier 22, the shallow electrode signal to the amplifier 23 and the medium induction signal to the amplifier 24. With the present apparatus, the induction and electrode signals are in terms of "conductivity." Amplifier 21 supplies the SP signal to a memory system 25. Amplifier 22 supplies the deep induction signal to a memory system 26. Amplifier 23 supplies the shallow electrode signal to a memory system 27. Amplifier 24 supplies the medium induction signal to a memory system 28. Only the memory system 27 is shown in detail, the others being of a similar construction.

Memory system 27 includes a plurality of storage condensers 30 mounted on a rotatable drum 31 of non-conductive material. Each of the condensers 30 is connected between an external contact point 32 and an internal slip-ring member 33. A sliding brush member 34 maintains continuous contact with the slip-ring member 33 and is connected to a ground terminal 35 so as to keep the slip-ring member 33 grounded. The drum member 31 is caused to rotate in step with the movement of the logging sonde 10 through the borehole by means of a measuring wheel 36 and a mechanical linkage 37 which connects the drum 31 to the measuring wheel 36. Measuring wheel 36 engages the cable 14 so that movement of the cable 14 will rotate the wheel 36 and, hence, the drum 31.

The signal from amplifier 23 is applied to the storage condensers 30 by way of a contact brush 38. In this manner, each condenser is charged to a voltage depending on the signal voltage when it is in contact with the brush 38. To facilitate this process, the amplifier 23 is provided with a very low output impedance. The signal voltages stored on the various condensers 30 are subsequently sampled by means of output contact brushes 39.

Each of the other memory system 25, 26 and 28 is of similar construction, each being mechanically rotated by means of the same linkage 37 and measuring wheel 36. These other memory systems have lesser members of output contact brushes in accordance with the particular use that is being made with the stored signal voltages.

Instead of using a rotating drum, stepping relays and stationary condensers may be used to provide each of the memory systems. This is described in greater detail in U.S. Patent No. 3,181,117 granted to W. J. Sloughter on Apr. 27, 1965.

One purpose of the memory systems 25–28 is to adjust the time of occurrence of the various measurement signals so that, at any given instant, the different output signals from the different memory systems will represent measurements obtained at the same depth in the borehole. This is necessary since the depth reference level for the deep induction system is located at position $L_1$ on the logging sonde 10 while the depth reference for the shallow induction system occurs at point $L_2$ and the depth reference points for the shallow electrode and SP measurements is at point $L_3$. The depth delays provided by the memory systems are adjusted to bring the signals back into step with one another. As will be seen, memory systems 26 and 27 also allow other purposes to be accomplished.

The SP signal from the memory system 25 is supplied to a photographic recorder 40 for recording on the recording medium or record chart thereof a permanent record of the SP signal values. Recorder 40 is of the multigalvonometer type and the recording medium (photographic film) is advanced in step with the movement of the logging sonde 10 through the borehole by means of the mechanical linkage 37.

Three depth-spaced samples of the deep induction signal are supplied from the memory system 26 by way of individual amplifiers 41, 42 and 43 to a weight and sum circuit 44. For the amplifiers, a minus (—) sign denotes a polarity reversal and a plus (+) sign denotes that the output is of the same polarity as the input. Weight and sum circuit 44 serves to combine selected fractions of the three deep induction signal samples to provide a single resultant signal value representing a more accurate measurement of a narrower vertical increment of the earth formation. This technique is described in greater detail in U.S. Patent No. 3,166,709, granted to H. G. Doll on Jan. 19, 1965, The resulting deep induction signal from weight and sum circuit 44 is then supplied to a ratio circuit 45. It is also supplied to a logarithmic circuit 46. The output from logarithmic circuit 46 is proportional to the logarithm of the resistivity measured with the deep induction system. This logarithmic signal is supplied to and recorded by the photographic recorder 40.

Multiple samples of the shallow electrode signals are supplied to contact brushes 39 to a weight and sum circuit 47. Weight annd sum circuit 47 provides a single output signal proportional to the average of the various input signal samples supplied thereto. In the present example, eight samples obtained at depth increments six inches apart in the borehole are averaged to provide the signal appearing at the output of the weight and sum circuit 47. This means that the effective vertical increment of measurement represented by this output signal corresponds approximately to a four-foot vertical increment in the borehole. Among other things, this makes the vertical resolution for the shallow electrode measurements more nearly the same as the vertical resolution for the induction measurements. This averaged shallow electrode signal is supplied to a second input of the ratio circuit 45.

The output signal from ratio circuit 45 is proportional to the ratio $$R_{ELS}/R_{ILD}$$

where $R_{ELS}$ is the resistivity measured with the shallow electrode system and $R_{ILD}$ is the resistivity measured with the deep induction system.

This ratio signal is supplied to a first input of a weight and sum circuit 48. A constant reference voltage $-V$ is supplied to a second input of the weight and sum circuit 48. Weight and sum circuit 48 operates to produce a desired "quick-look" signal in accordance with the following expression:

$$\left(\frac{R_{xo}}{R_t}\right)_{QL} = \frac{5}{3} \cdot \frac{R_{ELS}}{R_{ILD}} - \frac{2}{3} \qquad (1)$$

Under favorable conditions (which covers the majority of cases), this quick-look signal corresponds quite closely to the actual $R_{xo}/R_t$ value. The constant reference voltage $-V$ is used to obtain the "2/3" factor in Equation 1.

The quick-look (QL) signal from weight and sum circuit 48 is supplied to a logarithmic circuit 49. The output signal from circuit 49 is proportional to the logarithm of the input signal. This logarithmic signal is supplied by way of an adjustable potentiometer 50 to an amplifier 51. Potentiometer 50 is adjusted to provide a desired K factor. The signal appearing at the output of amplifier 51, designated as X, is supplied to and recorded by photographic recorder 40. It is also supplied to a difference circuit 52. To a second input of the difference circuit 52 is supplied to SP signal. The resulting difference signal appearing at the output of circuit 52 is designated as Δ and is supplied by way of a switch 53 to a photographic recorder 40. If it is not desired to record this difference signal Δ, this may be accomplished by opening the switch 53.

The medium induction signal appearing at the output of memory system 28 is supplied to a logarithmic circuit 54. In response thereto, logarithmic circuit 54 produces an output signal which is proportional to the logarithm of the resistivity measured by the medium induction system. This logarithmic signal is supplied to and recorded by the recorder 40.

The medium induction signal appearing at the output of memory system 28 is also supplied to a first input of a second ratio circuit 55. To the second input of ratio circuit 55 is supplied the deep induction signal appearing at the output of the weight and sum circuit 44. Ratio circuit 55 operates to produce an output signal proportional to $$R_{ILM}/R_{ILD}$$

where $R_{ILM}$ is the resistivity measured by the medium induction system and $R_{ILD}$ is the resistivity measured by the deep induction system. This second ratio signal is then supplied to and recorded by the recorder 40.

The shallow electrode signal obtained from the control panel 20 is also supplied to a logarithmic circuit 56. Circuit 56 operates to produce an output signal proportional to the logarithm of the resistivity measured by the shallow electrode system. This signal is supplied to and recorded by the recorder 40. If desired, the input signal for the logarithmic circuit 56 may be obtained from the weight and sum circuit 47 instead of from the control panel 20. In that case, the recorded logarithmic signal would correspond to the averaged shallow electrode system measurement.

A portion of a representative record or log produced by the photographic recorder 40 is shown in FIGURE 2 of the drawings. As there seen, the SP, Δ, X and $R_{ILM}/R_{ILD}$ signals are recorded on a left-hand portion of the log with the abscissa scale being a linear scale. The three logarithmic signals obtained from the deep induction, medium induction and shallow electrode measurements are recorded on a right-hand portion of the log for which the abscissa scale is a logarithmic scale. In both cases, the ordinate scale is scaled linearly in terms of depth levels in the borehole.

Considering now the operation of the apparatus and its use in practicing the methods of the present invention, the logging sonde 10 is moved in a continuous manner (usually upwardly) through the borehole 11 and at the same time the various coil and electrode systems are continuously operative to measure the various quantities they are intended to measure. The resulting measurement signals are sent up the cable 14 to the various signal processing and recording circuits located at the surface of the earth. These circuits operate in the manner previously described to produce the various signals which are recorded on the moving record chart within the photographic recorder 40 to provide continuous records of the various signals as a function of depth in the borehole.

The magnitude of the recorded SP signal is described by the relationship:

$$SP = -K \log\left(\frac{R_{mf}}{R_w}\right) \qquad (2)$$

where SP denotes the peak-to-peak deflection of the SP signal, K is a constant dependent on borehole temperature, $R_{mf}$ is the resistivity of the filtrate phase of the drilling mud and $R_w$ is the resistivity of the connate water originally contained in the earth formation before the drilling of the borehole. If the formation is invaded, $R_w$ will be pushed back and away from the borehole but will still be found at a greater depth than the lateral depth of invasion, i.e., in the "uninvaded" or "uncontaminated" portion of the earth formation.

The signal X appearing at the output of the amplifier 51 is described by the mathematical relationship:

$$X = -K \log\left(\frac{R_{xo}}{R_t}\right)_{QL} \qquad (3)$$

The quick-look ratio $R_{xo}/R_t$ is, as previously mentioned, obtained from the shallow electrode and the deep induction measurements.

Surprisingly, the signal X of Equation 3 will, in many cases, be identical to the SP signal and the two curves will track one another quite nicely on the recorded log. Surprisingly, when X and SP do not coincide, the departure indicates the occurrence of hydrocarbon fluid in the earth formation, provided there is a sufficient lateral depth of filtrate invasion to provide a meaningful $R_{xo}$ value. In the greater majority of cases, the latter condition will in fact exist.

This behavior is illustrated by the SP and X curves as shown in FIG. 2. These two curves track one another quite closely in both shales and in the water sand (pore space 100% filled with water). They differ in the oil sands. It can be shown that the magnitude of this difference provides an indication of the movability of the hydrocarbon fluid, i.e., the percentage of the hydrocarbon fluid which is readily movable. The non-movable portion of the hydrocarbon fluid is referred to as "residual." The difference between the SP and X curves is:

$$\Delta = SP - X \qquad (4)$$

where Δ is used to denote the difference.

By means of Archie's saturation formula, it can be shown that $$\Delta = 2K \log\left(\frac{S_w}{S_{xo}}\right) \qquad (5)$$

where $S_w$ is the water saturation in an uncontaminated or uninvaded portion of the earth formation and $S_{xo}$ is the water saturation in the completely invaded or flushed portion of the earth formation. In each case, the saturation is expressed as a fraction of the formation pore space. Thus 100% water saturation means that the pore space is 100% filled with water. If the saturation is less than 100%, then the remainder of the pore space contains hydrocarbon fluid. As for Equation 3, Equation 5 is highly accurate only if the filtrate invasion is sufficiently deep to provide a meaningful $R_{xo}$ measurement with the particular shallow investigation device being used.

In the case of a 100% water-bearing sand, $S_w$ is equal to $S_{xo}$ (both are equal to unity) and the ratio becomes unity. Consequently, the logarithm of the ratio and, hence, Δ becomes zero. Thus, the SP and X curves coincide with one another.

If, on the other hand, the formation is oil-bearing and most of the oil is movable (very little residual oil saturation), then the fluid in the invaded zone will be almost entirely mud filtrate and $R_{xo}$ and $S_{xo}$ will be about the same as in the case of the water sand. $R_t$ and $S_w$, however, will be different because of the presence of the oil in the non-invaded region. $R_t$ will be greater and $S_w$ will be less than in a comparable water sand. In such cases, the separation between the SP and X curves will be a maximum. In terms of Equation 5, the $S_w/S_{xo}$ becomes less than unity. Consequently, the logarithm of the ratio becomes a negative quantity of increasing magnitude for decreasing $S_w$ values. Thus the Δ curve of FIG. 2 deflects more and more toward the left.

If the residual oil saturation in the flushed zone increases $S_{xo}$ will also decrease. As a consequence, the difference Δ between the SP and X curves will become less. In the limiting case, where none of the oil is movable, the difference should become zero and the SP and X should coincide. Thus, by recording the SP and X curves on the same part of the record chart or log, there is further provided a measure of the movable oil fraction for the case of oil-bearing formations.

The difference curve Δ is also shown on the FIG. 2 log. As seen, it follows the shale base line for the case of water sands and deflects towards the left for the case of oil-bearing sands, the deflection increasing in magnitude, the greater the proportion of movable oil compared to residual oil.

In the examples illustrated in FIG. 2, the upper oil sand at about 5,200 feet has very little residual oil saturation in the flushed zone and, hence, good separation is obtained between the SP and X curves. The lower oil sand at and below 5,300 feet, on the other hand, has considerable residual oil saturation, hence giving noticeably less separation between the SP and X curves.

Equation 1 above gives the relationship for obtaining the quick-look $R_{xo}/R_t$ value from the $R_{ELS}/R_{ILD}$ ratio for the two particular devices shown in FIG. 1 of the drawings. The general relationship is of the form:

$$\left(\frac{R_{xo}}{R_t}\right)_{QL} = A \cdot \left(\frac{R_s}{R_d}\right) - B \quad (6)$$

where $R_s$ denotes the resistivity measured with a shallow investigation device, $R_d$ denotes the resistivity as measured with a deeper investigation device and A and B are constants whose numerical values depend upon the two particular devices (including their dimensions) used to provide the $R_s$ and $R_d$ measurements.

The relationship between "resistivity" and "conductivity" should also be borne in mind. This relationship is:

$$R = \frac{1}{C} \quad (7)$$

where one is the reciprocal of the other. Both relate to the same basic electrical characteristic and hence a measurement of one provides an indication of the other and vice versa. In this connection, the following equivalence should be observed:

$$\frac{R_s}{R_d} = \frac{C_d}{C_s} = \frac{1}{R_d \cdot C_s} = R_s \cdot C_d \quad (8)$$

Thus, in some cases, the ratio circuit 45 used in forming the quick-look signal could be replaced by a multiplying circuit, provided the proper input signals are available (e.g., $R_s$ and $C_d$ signals).

As mentioned earlier, in order to obtain accurate results, it is necessary that the permeable earth formations should be invaded sufficiently so that the shallow investigation device may provide a meaningful $R_{xo}$ measurement. For the case of the particular shallow investigation electrode system and the particular deep investigation induction system shown in FIG. 1, accurate results are obtained whenever the filtrate invasion is such that the diameter of the invaded zone is 30 inches or greater. For the case of an eight-inch diameter borehole, this means that the filtrate fluid should invade inwardly a distance of at least 11 inches from the wall of the borehole.

The minimum limit of invasion for good accuracy can be lowered by using electrode devices having even shallower depths of lateral investigation. If, for example, the electrode system of FIG. 1 is replaced by a wall-engaging pad-type electrode system of the type described in U.S. Patent No. 3,132,298, granted to H. G. Doll and J. L. Dumanoir on May 5, 1964, then the minimum invasion diameter for good accuracy becomes approximately 18 inches. For the case of an eight-inch diameter borehole, this means a minimum invasion of five inches into the earth formation.

The devices shown in FIG. 1 are adequate for most fairly consolidated earth formations. For highly unconsolidated or soft formations, a shallower investigation electrode device should be used.

In order to recognize those cases where the filtrate invasion is not deep enough to insure a high degree of accuracy, there is provided on the recorded log a further curve which serves as an invasion diameter indicator or index. This is represented on the FIG. 2 log by curve 60. Curve 60 is a plot of the ratio of:

$$R_{ILM}/R_{ILD}$$

The scale calibration for this curve is indicated at 61 in FIG. 2. This ratio is obtained by means of the ratio circuit 55 of FIG. 1 (bearing in mind the relationship between "resistivity" and "conductivity").

If there is no filtrate invasion, then the medium and deep induction devices both read the same and the ratio will be unity. This is, of course, the case for the shale beds. As the depth of invasion increases, the medium depth induction device will be more and more affected by such invasion. Thus (assuming fresh drilling muds), the ratio will increase for increasing depths of invasion.

It has been found that for the case of the particular devices shown in FIG. 1 that any time this ratio is equal to or greater than a value of 1.15, then the depth of filtrate invasion is sufficient to provide good accuracy for the X and Δ values. In FIG. 2, the invasion index ratio is 1.4 for the water sand and the upper oil sand and is 1.6 for the lower oil sand. Thus, the X and Δ values in these cases are reliable.

If the invasion index ratio is less than 1.15, then the X and Δ curves should be used with caution because what might appear to be the presence of oil might instead be the lack of very much filtrate invasion. It is observed, however, that even in these cases, the possibility of an oil-bearing formation is not overlooked.

One word of explanation should be given with respect to the logarithmic circuits 46, 54 and 56 of FIG. 1. The fact that the input signal can be in terms of "conductivity" and the output signal in terms of "resistivity" is a unique feature of the logarithmic operation. This results from the relationship:

$$\log R = -\log C \quad (9)$$

where C denotes the input conductivity signal and R denotes the output resistivity signal.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of investigating subsurface earth formations traversed by a borehole containing a drilling fluid comprising:
    obtaining measurements along the borehole indicative of the electrical resistivity of first and second portions of the formations, the first portion being relatively near the borehole and the second portion being at a greater distance from the borehole;

combining the first and second resistivity indicative measurements obtained at common depths in the borehole to obtain third measurements, each proportional to the logarithm of a function of $$A\left(\frac{R_s}{R_d}\right)-B$$

where $R_s$ is the resistivity of the formation portion nearer the borehole, $R_d$ is the resistivity of the formation portion at the greater distance from the borehole and A and B are proportionality constants;

obtaining measurements along the borehole of the spontaneous potential occurring in the borehole;

and subtracting the spontaneous potential measurements and the third measurements for common depths to obtain difference measurements Δ, in general accordance with the equation $$\Delta = SP - X$$

where SP is the spontaneous potential and X is the third measurement, said difference measurements being indicative of the percentage of readily movable hydrocarbon fluid in the formation.

2. A method according to claim 1 wherein said subtracting step further comprises:

the steps of obtaining measurements along the borehole of the electrical resistivity, $R_m$, of third portions of the formations, said third portions being in between said near and greater distance portions;

obtaining further measurements, each proportional to a function of the ratio of $$R_m/R_d$$

and combining said further measurements with said spontaneous subtraction step to determine the accuracy of said subtraction step.

3. Equipment for analyzing earth formations traversed by a borehole comprising:

circuit means utilizing data derived from a logging instrument lowered through the borehole for producing separate electrical signals that correspond respectively to the electrical resistivity of first and second portions of the earth formations and the spontaneous potential occurring in the borehole, said first portion being relatively near the borehole and said second portion being at a greater distance from the borehole;

further circuit means responsive to said first and second portion resistivity signals to establish signals proportional to the logarithm of a function of $$A\left(\frac{R_s}{R_d}\right)-B$$

where $R_s$ is the resistivity of the formation portion nearer the borehole, $R_d$ is the resistivity of the formation portion at the greater distance from the borehole, and A and B are proportionality constants;

and additional circuit means for producing another signal that corresponds to a difference, Δ, in accordance with the equation $$\Delta = SP - X$$

where SP is said spontaneous potential and X is said proportional signal, said difference signal being indicative of the percentage of readily movable hydrocarbon fluid in the formation.

4. A method of investigating subsurface earth formations traversed by a borehole containing a drilling fluid comprising:

obtaining measurements along the borehole indicative of the electrical resistivity of first and second portions of the formations, the first portion being relatively near the borehole and the second portion being at a greater distance from the borehole;

combining the first and second resistivity indicative measurements obtained at common depths in the borehole to obtain third measurements, each proportional to the logarithm of a function of $$A\left(\frac{R_s}{R_d}\right)-B$$

where $R_s$ is the resistivity of the formation portion nearer the borehole, $R_d$ is the resistivity of the formation portion at the greater distance from the borehole, and A and B are proportionality constants;

obtaining measurements along the borehole of the spontaneous potential occurring in the borehole;

and determining qualitatively the values separating the spontaneous potential measurements and the third measurements for common depths that are characteristic of the equation $$\Delta = SP - X$$

where SP is the spontaneous potential and X is the third measurement, said values being indicative of the percentage of readily movable hydrocarbon fluid in the formation.

References Cited

UNITED STATES PATENTS

| | | | |
|---|---|---|---|
| 3,002,148 | 9/1961 | Nall | 324—1 |
| 3,075,142 | 1/1963 | Albright et al. | 324—1 |
| 3,086,168 | 4/1963 | Buckner | 324—6 |
| 3,124,742 | 3/1964 | Schneider | 324—1 |
| 3,166,708 | 1/1965 | Millcan | 324—1 |
| 3,180,141 | 4/1965 | Alger | 324—1 XR |
| 3,329,889 | 7/1967 | Tanguy | 324—6 XR |

RUDOLPH V. ROLINEC, *Primary Examiner.*

G. R. STRECKER, *Assistant Examiner.*